United States Patent
Matulewicz et al.

(10) Patent No.: US 9,429,138 B2
(45) Date of Patent: Aug. 30, 2016

(54) APPARATUS, SYSTEM AND METHOD FOR WIND TURBINE COMPONENT REPLACEMENT

(71) Applicant: GAMESA INNOVATION & TECHNOLOGY, S.L., Sarriguren (ES)

(72) Inventors: Marek Matulewicz, Levittown, PA (US); David Gomez Santamaria, Zamudio (ES); Inmaculada Alonso Hernandez, Zamudio (ES); Gorka Uriarte Mijangos, Zamudio (ES); Pedro Munarriz Andres, Sarriguren (ES)

(73) Assignee: GAMESA INNOVATION & TECHNOLOGY, S.L., Sarriguren (ES)

( * ) Notice: Subject to any disclaimer, the term of this patent is extended or adjusted under 35 U.S.C. 154(b) by 399 days.

(21) Appl. No.: 13/963,540

(22) Filed: Aug. 9, 2013

(65) Prior Publication Data

US 2015/0044011 A1 Feb. 12, 2015

(51) Int. Cl.
| | | |
|---|---|---|
| B66C 1/10 | (2006.01) | |
| F03D 1/00 | (2006.01) | |
| B66D 1/60 | (2006.01) | |
| B66C 23/20 | (2006.01) | |

(52) U.S. Cl.
CPC .............. *F03D 1/003* (2013.01); *B66C 23/207* (2013.01); *B66D 1/60* (2013.01); *F05B 2230/61* (2013.01); *F05B 2240/916* (2013.01); *Y02E 10/726* (2013.01); *Y02E 10/728* (2013.01); *Y02P 70/523* (2015.11)

(58) Field of Classification Search
CPC ........... B66C 1/10; B66C 1/108; B66C 1/16; B66C 1/64; B66C 9/02; B66C 11/12; B66D 1/60; F03D 1/001; F03D 1/003; F05B 2240/916; Y02E 10/726
See application file for complete search history.

(56) References Cited

U.S. PATENT DOCUMENTS

| | | | | |
|---|---|---|---|---|
| 7,112,010 | B1 * | 9/2006 | Geiger | B66C 23/52 405/195.1 |
| 2007/0200103 | A1 * | 8/2007 | Viladomiu i Guarro | B66C 23/207 254/334 |
| 2008/0216301 | A1 * | 9/2008 | Hansen | B66C 1/108 29/428 |
| 2009/0173573 | A1 * | 7/2009 | Teichert | E04G 3/30 182/19 |
| 2010/0028152 | A1 * | 2/2010 | Numajiri | B66C 1/108 416/146 R |
| 2011/0042632 | A1 * | 2/2011 | Van Berlo | B66C 23/18 254/264 |
| 2011/0094987 | A1 * | 4/2011 | Botwright | B66C 1/108 212/274 |
| 2011/0220538 | A1 * | 9/2011 | Nies | B66C 1/108 206/525 |
| 2011/0221215 | A1 * | 9/2011 | Botwright | B66C 1/108 294/81.4 |
| 2011/0318496 | A1 * | 12/2011 | Jensen | F03D 11/0016 427/427.3 |
| 2012/0124833 | A1 * | 5/2012 | Arendt | F03D 1/001 29/889.7 |
| 2012/0168252 | A1 * | 7/2012 | Bogaert | F03D 1/003 182/142 |
| 2012/0217089 | A1 * | 8/2012 | Fenger | F03D 1/003 182/2.1 |
| 2015/0023790 | A1 * | 1/2015 | Friis | B66C 1/108 415/213.1 |

* cited by examiner

*Primary Examiner* — Emmanuel M Marcelo
(74) *Attorney, Agent, or Firm* — Maier & Maier, PLLC

(57) ABSTRACT

A system, apparatus and method for wind turbine component replacement. The method may include coupling a spreader to a wind turbine component, raising a hoist into the nacelle, raising a spool of cable into a nacelle of the wind turbine, mounting the hoist on a member of the nacelle, routing the cable from the spool of cable to the hoist, and routing the cable between at least one sheave disposed on the hoist and at least one sheave disposed on the spreader. The system may include a spreader, the spreader adapted to couple to a wind turbine component, the spreader including at least one longitudinal member, a pair of transverse members, and at least one first sheave, and a hoist, the hoist adapted to couple to a member of the nacelle, the hoist including a frame, a motor, and at least one second sheave.

7 Claims, 9 Drawing Sheets

APPARATUS, SYSTEM AND METHOD FOR WIND TURBINE COMPONENT REPLACEMENT

BACKGROUND

In recent years, wind turbines have increased in popularity as a means of electrical power generation. Wind turbines offer the advantages of relatively inexpensively generating power from a renewable energy source as well as having a low impact on the surrounding environment.

Replacing malfunctioning or failed components in wind turbines can present significant expense to the turbine operator, especially in the case of large or heavy components disposed in the nacelle of the turbine. Such components can include, for example, intercooler gearing motors, cooling fans of the wind turbine, rotor bearings of the generator, intercooler, and so forth. In certain cases, such as, for example, fatal rotor failure, the entire generator may need to be replaced, as the work required to replace the failed components cannot be performed with the generator disposed within the nacelle.

Typically, a generator for a wind turbine can weigh approximately 5-7 metric tons, with the intercooler accounting for about 700 kilograms of the total weight, and the rotor and stator assembly accounting for the remainder. In part due to the considerable weight of the components, known methods of generator replacement typically involve removing the roof of the nacelle and utilizing an external heavy-duty crane to lift the generator and intercooler out of the nacelle, transferring the components to to the ground below, utilizing the crane to lift replacement components into the nacelle, and replacing the roof of the nacelle. However, the cost to replace wind turbine utilizing an external crane can typically amount to as much as seven times the cost of the generator itself, in the case of land-based wind turbines. For offshore wind turbines, the cost of the replacement operation can be even higher.

Accordingly, a method, system and apparatus for replacing wind turbine components without the use of an external crane is desired.

SUMMARY

According to one exemplary embodiment, a method for wind turbine component replacement is disclosed. The method may include coupling a spreader to a wind turbine component, raising a hoist into the nacelle, raising a spool of cable into a nacelle of the wind turbine, mounting the hoist on a member of the nacelle, routing the cable from the spool of cable to the hoist, and routing the cable between at least one sheave disposed on the hoist and at least one sheave disposed on the spreader.

According to another exemplary embodiment, a system for wind turbine component replacement is disclosed. The system may include a spreader, the spreader adapted to couple to a wind turbine component, the spreader including at least one longitudinal member, a pair of transverse members, and at least one first sheave, and a hoist, the hoist adapted to couple to a member of the nacelle, the hoist including a frame, a motor, and at least one second sheave.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a system 100 for wind turbine component replacement may be disclosed. The system can include a hoist, the hoist being adapted to couple to a structural member or movable member of a wind turbine nacelle, and a spreader, the spreader being adapted to couple to a wind turbine component, for example a generator, an intercooler, or any other desired component.

Figure 1:
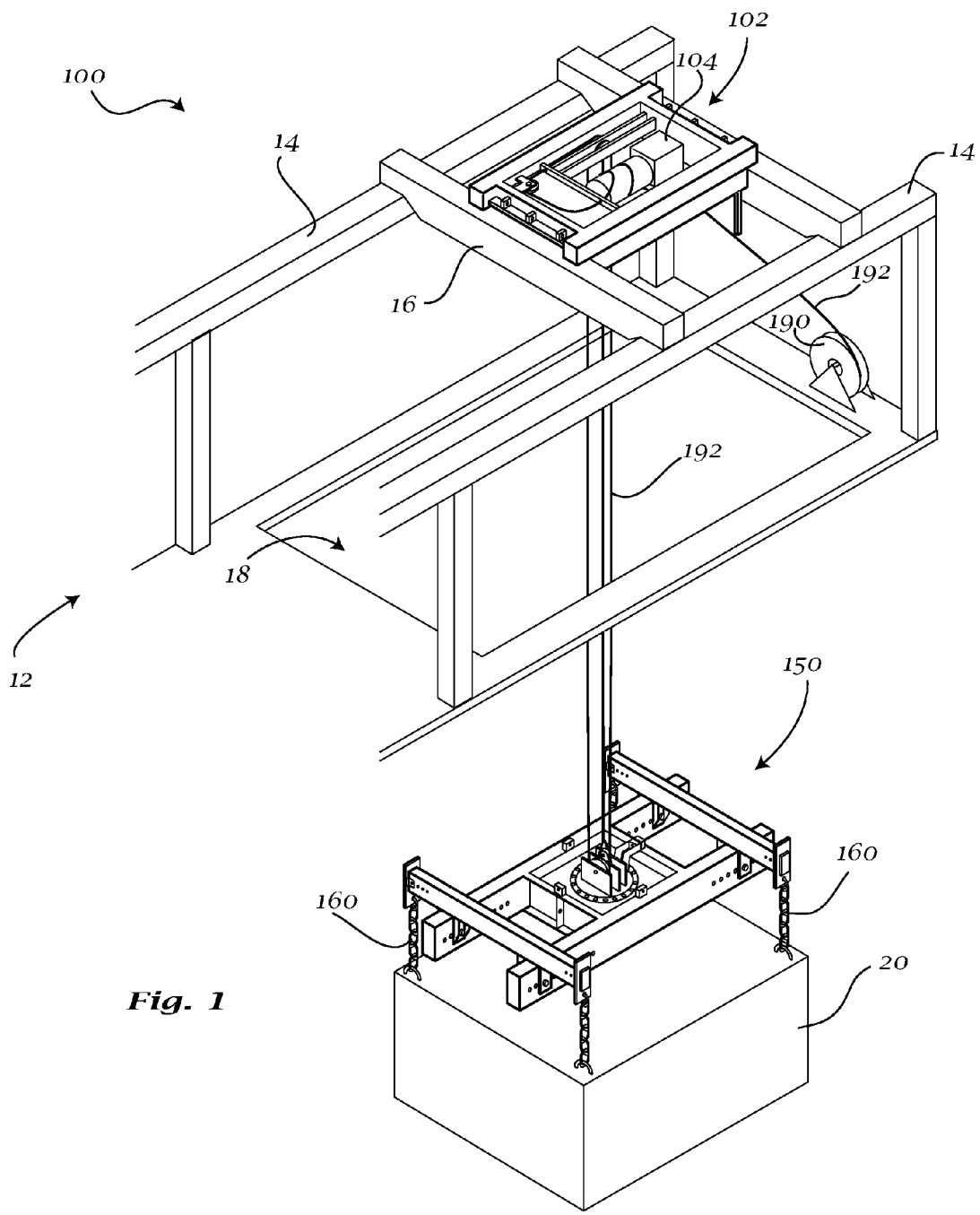
FIG. 1 shows an exemplary schematic of a wind turbine nacelle and a system for wind turbine component replacement.

FIG. 1 shows an exemplary embodiment of system 100, including hoist 102 and spreader 150. Hoist 102 and spreader 150 may be coupled via a cable 192 sourced from a spool 190 and routed through hoist 102 and between hoist 102 and spreader 150. Hoist 102 may be disposed within a nacelle 12 of a wind turbine, and may be disposed on top of a member of the nacelle. The member of the nacelle may be a structural member 14 or a movable member, for example a trolley 16 which can move along longitudinal structural members of the nacelle. Hoist 102 can include a motor 104 adapted to drive cable 192 through hoist 102. Cable 192 may be routed through at least one sheave rotatably coupled to hoist 102, through an opening 18 in the nacelle 12, for example a service hatch. Cable 192 may further be operatively coupled to spreader 150, for example via at least one sheave coupled to the spreader 150. Spreader 150 and hoist 102v may include any desired number of sheaves, for example between one and three sheaves each, so as to be adaptable to the motor, operating conditions and wind turbine components of the particular situation and environment. Spreader 150 may further be removably coupled to a wind turbine component 20, for example by a plurality of chains, straps, or other connecting members 160 extending between the spreader and the wind turbine component. Thus, system 100 can facilitate lifting desired wind turbine components into the nacelle of the turbine, as described further below.

Figure 2:
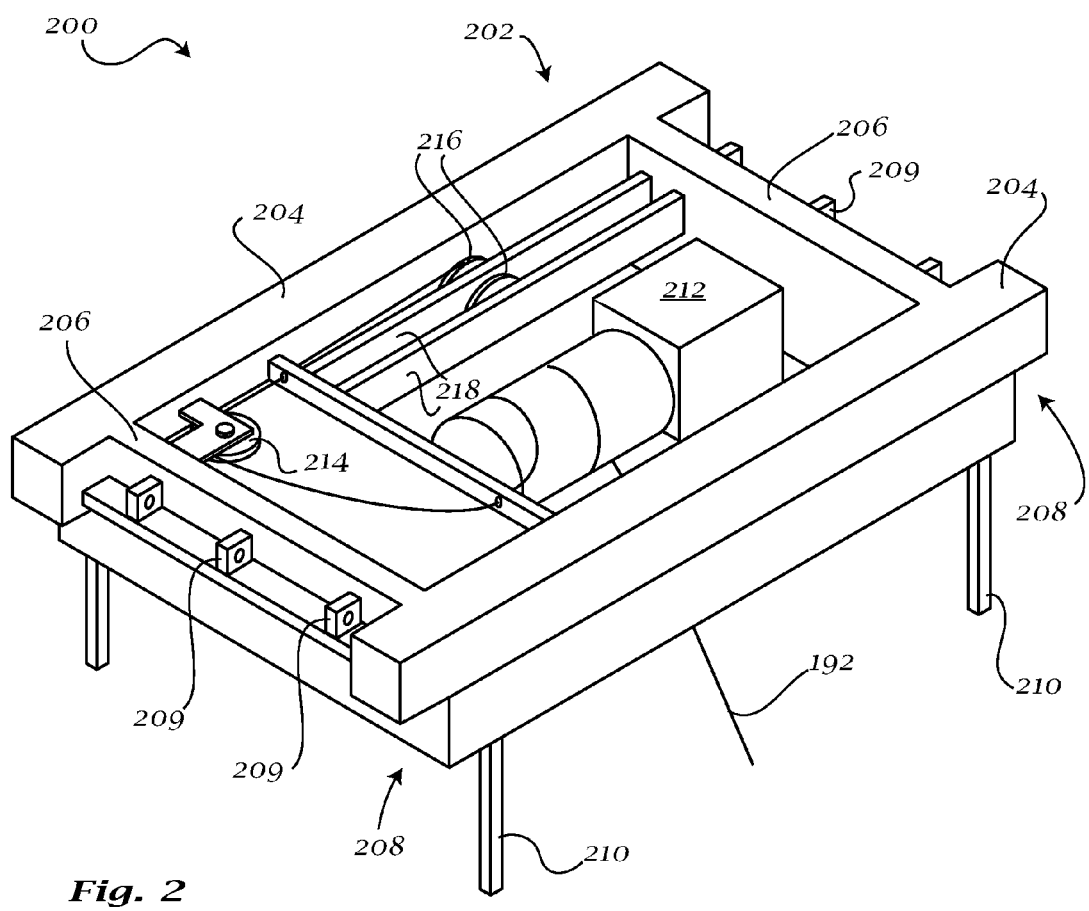
FIG. 2 shows an exemplary embodiment of a hoist for a system for wind turbine component replacement.

FIG. 2 shows an exemplary embodiment 200 of a hoist for a system for wind turbine component replacement. Hoist 200 may include a frame 202 sized and shaped to be disposed over members of the nacelle, for example a movable trolley of the nacelle or a structural member of the nacelle. Frame 202 may include at least two longitudinal members 204 and at least two transverse members 206, the longitudinal members having cutouts 208 defined in both ends thereof. Cutouts 208 may be provided to receive a portion of a member of the nacelle, so as to securely dispose hoist 200 over the member. A plurality of legs 210 may extend downward from frame 202 of hoist 200, so as to provide clearance for the motor and other components of hoist 200 when the hoist is disposed on a surface. Attachment points 209 may be provided on frame 202, so as to facilitate lifting hoist 200 in a vertical orientation.

Motor 212 may be disposed in the space defined by longitudinal members 204 and transverse members 206. A horizontal sheave 214 may be rotatably coupled to frame 202 of hoist 200. At least one vertical sheave 216, for example a pair of vertical sheaves 216, may be rotatably coupled to an axle extending between frame 202 and at least one supporting member 218, the at least one supporting member 218 extending within the space defined by members 204, 206. A supporting member 218 may be provided for each vertical sheave 216 of hoist 200. Motor 212, horizontal sheave 214 and at least one vertical sheave 216 may provide a path for a cable 192, which may then be rigged to an embodiment of a spreader.

Motor 212 may be any motor known in the art that enables system 100 to function as described herein. For example, motor 212 may have a power rating of approximately 7-8 horsepower. Motor 212 may further include a gearbox therein. In some embodiments, motor 212 may be a Tirak™ or similar type motor manufactured by the Tractel Group. Motor 212 may be controlled by the operator via a control panel, which may be remote from motor 212 and may be operably coupled to motor 212. Motor 212 may further engage cable 192 so as to provide the requisite force to move the cable as desired.

Figure 3A:
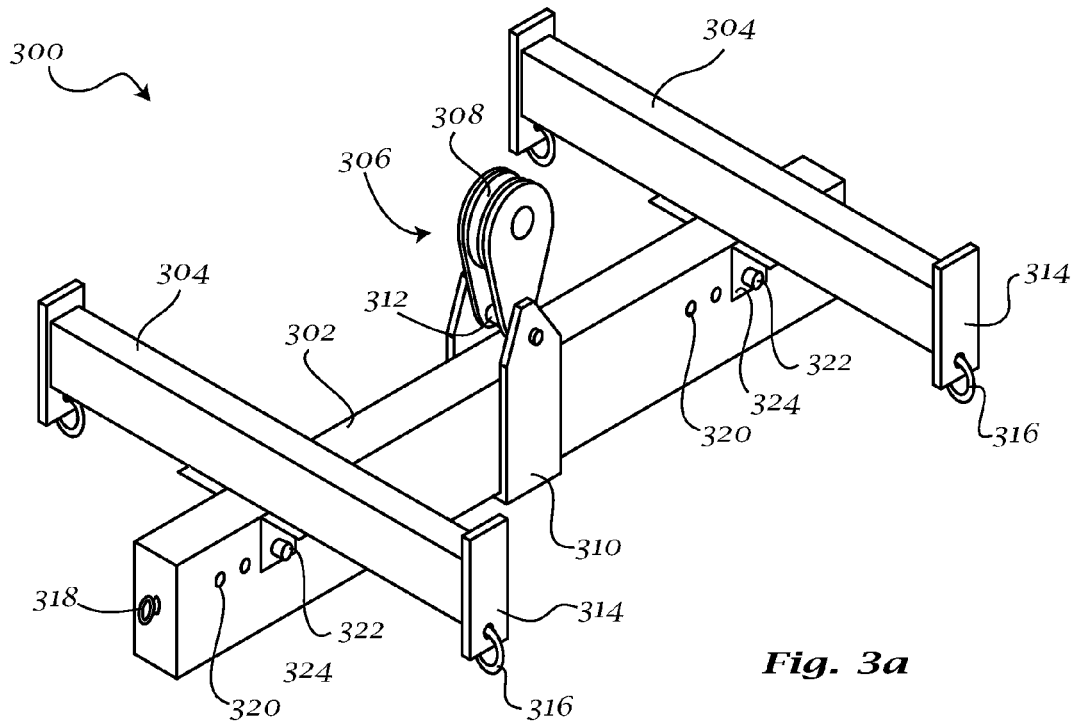
FIGS. 3a-3b show an exemplary embodiment of a spreader for a system for wind turbine component replacement.

Turning to FIG. 3a, an exemplary embodiment 300 of a spreader for system 100 is shown. Spreader 300 may include a longitudinal member 302 and a pair of transverse members 304 adjustably coupled to the longitudinal member. A pulley 306 having a sheave 308 may be coupled to the longitudinal member substantially at the midpoint thereof. Coupling between pulley 306 and longitudinal member 302 may be facilitated by a substantially U-shaped bracket 310 disposed around longitudinal member 302, the pulley 306 being coupled to the open end of bracket 310 via a pin 312 or any other coupling that enables system 100 to function as described herein.

Each of transverse members 304 may include an end plate 314 substantially at each end thereof. Each end plate 314 may include an attachment point 316 substantially at the bottom thereof. Coupling of spreader 300 to a wind turbine component may be facilitated by straps, chains, or other connecting members, each of which may have one end coupled to an attachment point 316 of spreader 300 and a second end coupled to an attachment point on the wind turbine component. Additional attachment points 318 may be provided on longitudinal member 302, for example substantially at the ends thereof, so as to facilitate lifting spreader 300 in a vertical orientation.

Spreader 300 may be adapted for diverse sizes of components. To that end, the positions of transverse members 304 along longitudinal member may be adjusted. A plurality of apertures 320 may be provided along portions of the length of longitudinal member 302. A pin 322 or other securing member may be inserted through apertures 320 and through brackets 324 coupled to transverse member 304, so as to couple the transverse member to the longitudinal member at the desired position.

Figure 3B:
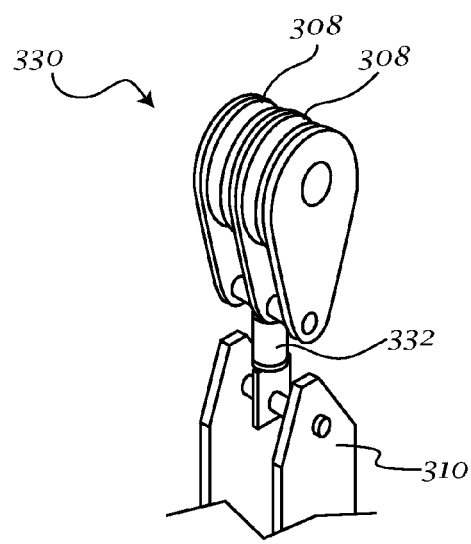

In some exemplary embodiments, as shown in FIG. 3b, another exemplary embodiment of a pulley 330 may have a pair of sheaves 308. This can allow for triple-rigging of the cable between pulley 330 and sheaves 216 of hoist 200, so as to reduce the load on the motor and reduce the likelihood of motor 212 overheating. Furthermore, pulley 330 may be swivelably coupled to spreader 300 via a swivelable coupling 332, for example a swivel block. Swivelable coupling 332 may be coupled to U-shaped bracket 310. This can allow spreader 300 to rotate with respect to pulley 330, thereby reducing the likelihood of the cable becoming tangled or twisted during the raising or lowering procedure.

Figure 4:
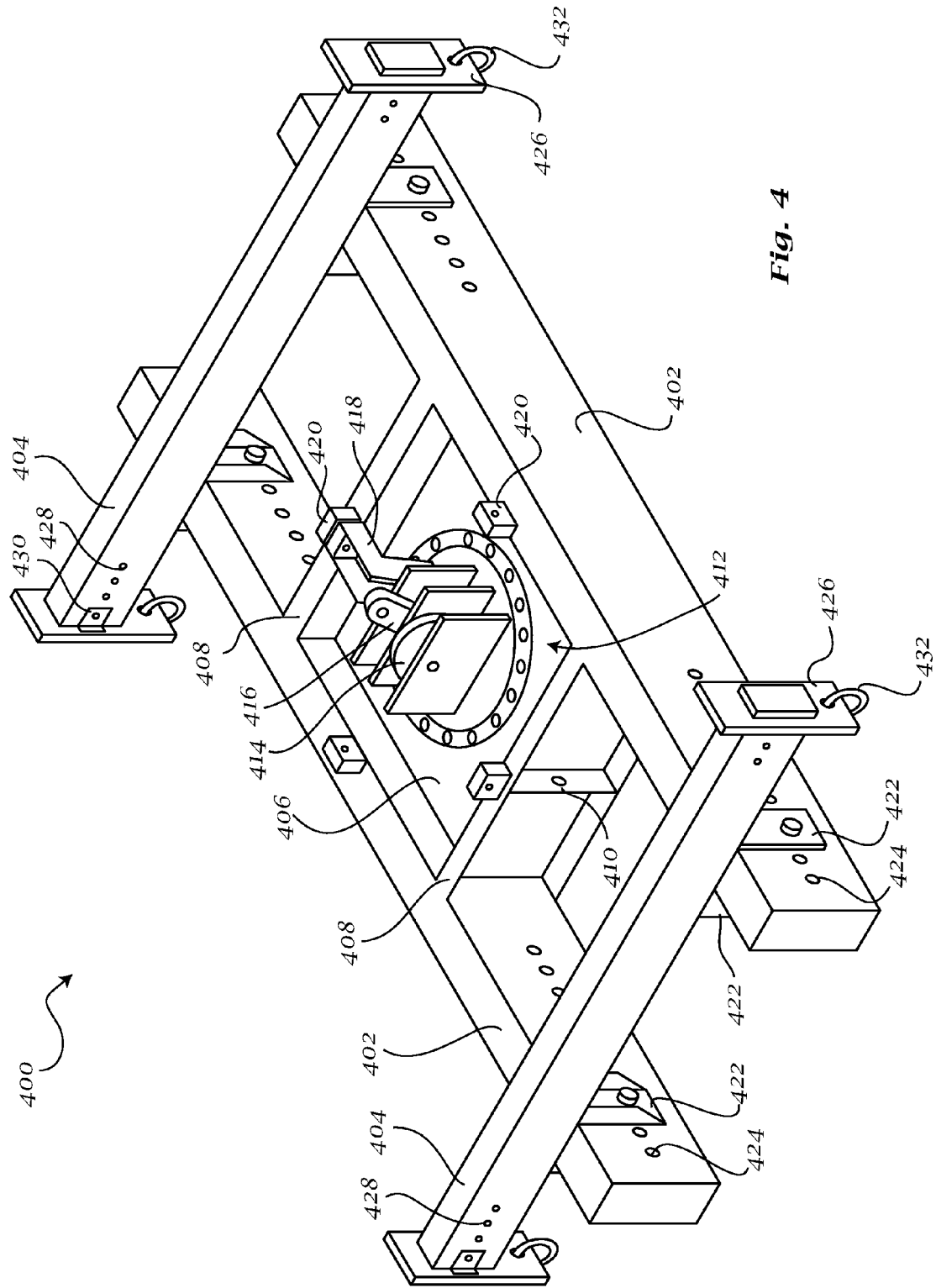
FIG. 4 shows another exemplary embodiment of a spreader for a system for wind turbine component replacement.

Turning to FIG. 4, another exemplary embodiment 400 of a spreader for system 100 is shown. Spreader 400 may include a pair of longitudinal members 402 and a pair of transverse members 404 adjustably coupled to the longitudinal members. Longitudinal members 402 may be joined by a block 406 disposed between longitudinal members 402 substantially at the midpoints of longitudinal members 402. Block 406 may further be bounded by two transverse members 408 oriented transversely to longitudinal members 402. Attachment points 410 may be provided on block 406, for example on transverse members 408, so as to facilitate lifting spreader 400 in a vertical orientation.

Rotatably mounted within block 406 may be a rotatable pulley assembly 412. Pulley assembly 412 may include at least one sheave 414, a cable coupling member 416, and a locking member 418. Pulley assembly 412 may rotate within block 406 so as to reduce the likelihood of the cable being tangled or twisted during the raising or lowering procedure. Locking member 418 may extend between the rotatable portion of pulley assembly 412 and an anchor 420. Locking member 418 may engage one of four anchors 420, so as to fix pulley assembly 406 in a desired position and inhibit the rotation of pulley assembly 406. Coupling between locking member 418 and an anchor 420 may be facilitated, for example, by a pin or other fastening member inserted through and removably coupled to apertures provided in anchors 420 and locking member 418.

Each of transverse members 404 may include two pairs of downward projections 422, each pair of projections 422 sized to receive a portion of a longitudinal member 402 therebetween. Furthermore, apertures may be provided in each downward projection 422, the apertures positioned to be in line with corresponding apertures 424 provided on portions of longitudinal members 402. The positions of transverse members 404 along longitudinal members 402 can therefore be adjusted so as to accommodate varying sizes of wind turbine components. Transverse members 404 may then be fixed in a desired position by pins or other fastening members, inserted through the apertures.

Each of transverse members 404 may include an end plate 426 substantially at each end thereof. Each end plate 426 may include an aperture through which the transverse member may be received. A plurality of apertures 428 may be provided along portions of the length of each transverse member 404. A pin or other fastening member may be inserted through apertures 428 and through brackets 430 coupled to end plates 426, so as to couple the end plate to the transverse member at the desired position.

Each end plate 426 may further include an attachment point 432 substantially at the bottom thereof. Coupling of spreader 400 to a wind turbine component may be facilitated by straps, chains, or other connecting members, each of which may have one end coupled to an attachment point 432 of spreader 400 and a second end coupled to an attachment point on the wind turbine component.

Referring now to FIGS. 5a-5e, an exemplary method of wind turbine component replacement may be disclosed. An exemplary nacelle 12 of a wind turbine 10 can include a plurality of structural members 14, for example girders, beams, and so forth, which may be oriented longitudinally or transversely in relationship to the nacelle. The nacelle can further include a plurality of openings, for example a larger opening 19 and a smaller opening 18 which may be opened or closed as desired. A movable trolley 16 may be movably coupled to some of the structural members 14, such that the trolley can translate longitudinally along a portion of the length of the nacelle. A light-duty hoist 22 adapted for the lifting of consumables, materials, and smaller components, and which may have a lifting capacity of approximately 800 kg, may be coupled to trolley 16. A wind turbine component 20, for example the generator, intercooler, or any other component of the wind turbine may be disposed within the nacelle. A light-duty crane 24, which may have a lifting capacity of approximately 300 kg, may further be removably coupled to some of the structural members 14, for example, the roof security bars of the nacelle, or may be installed for the large component replacement operation.

Figure 5A:
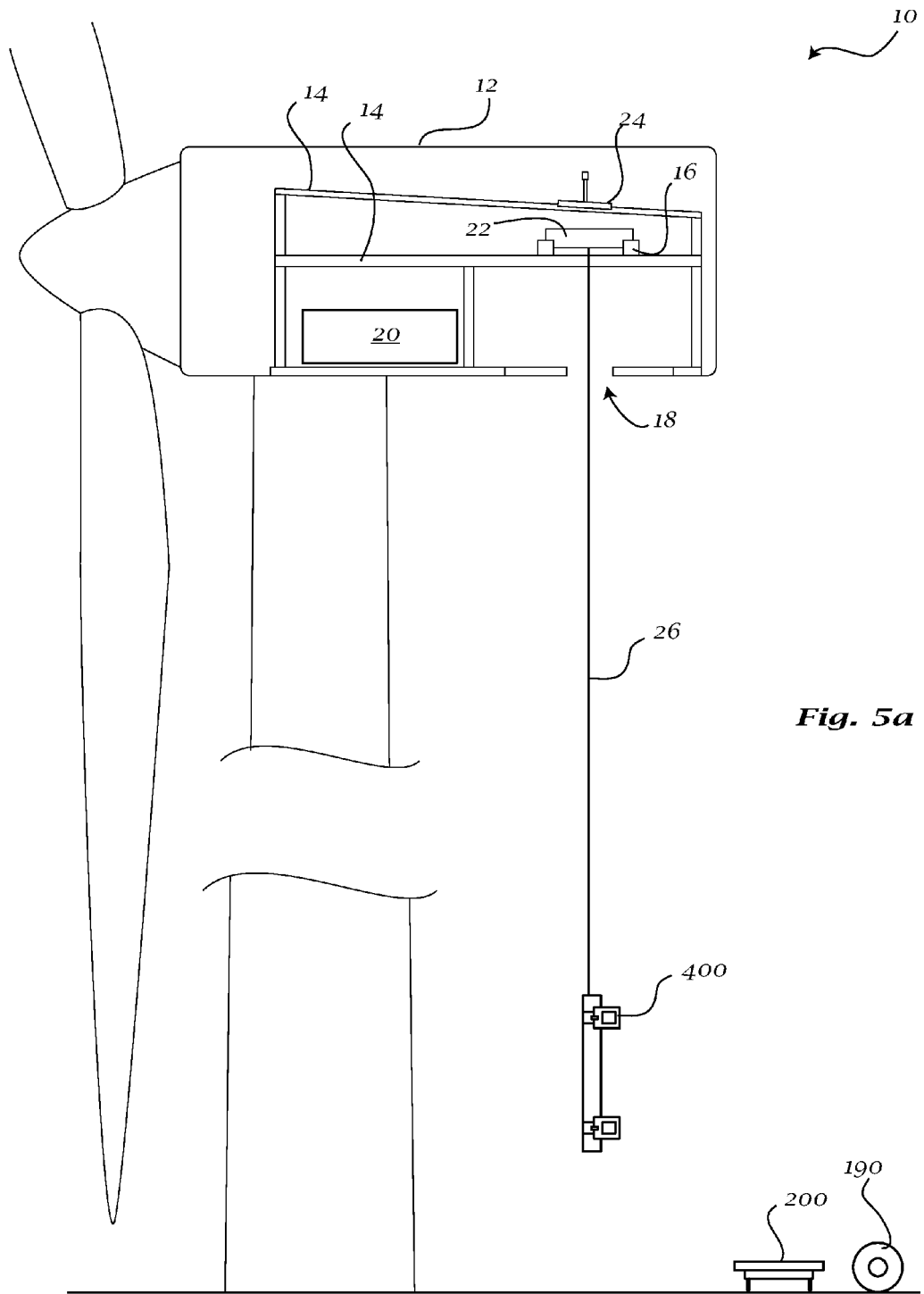
FIGS. 5a-5e illustrate an exemplary method for wind turbine component replacement.

FIG. 5a is a schematic showing the lifting of a spreader into nacelle 12. It should be appreciated that the method disclosed herein may be used with the exemplary embodiments of spreader 300, the exemplary embodiment of spreader 400, or any other spreader device that enables the method to be performed as described herein. Light-duty hoist 22 can be utilized to lift spreader 300/400 into nacelle 12. A cable 26 operatively coupled to light-duty hoist 22 may be coupled, for example using a hook, to an attachment point 410 on the spreader 300/400. This can allow spreader 300/400 to be lifted in a substantially vertical orientation, thereby allowing spreader 300/400 to pass through the smaller opening 18 in the nacelle. If desired, spreader 400 may be lifted in a disassembled configuration, with transverse members 404 decoupled from longitudinal members 402, or in the exemplary embodiment of spreader 300, with transverse members 304 decoupled from longitudinal members 302.

Subsequently, spreader 300/400 may be assembled, if necessary, and placed over component 20. Straps, chains, or any other appropriate connecting members can then be coupled to both attachment points 432 of end plates 426 of spreader 400, and to corresponding attachment points on the component 20. If the exemplary embodiment of spreader 300 is used, Straps, chains, or any other appropriate connecting members can then be coupled to both attachment points 316 of end plates 314 of spreader 300, and to corresponding attachment points on the component 20.

Figure 5B:
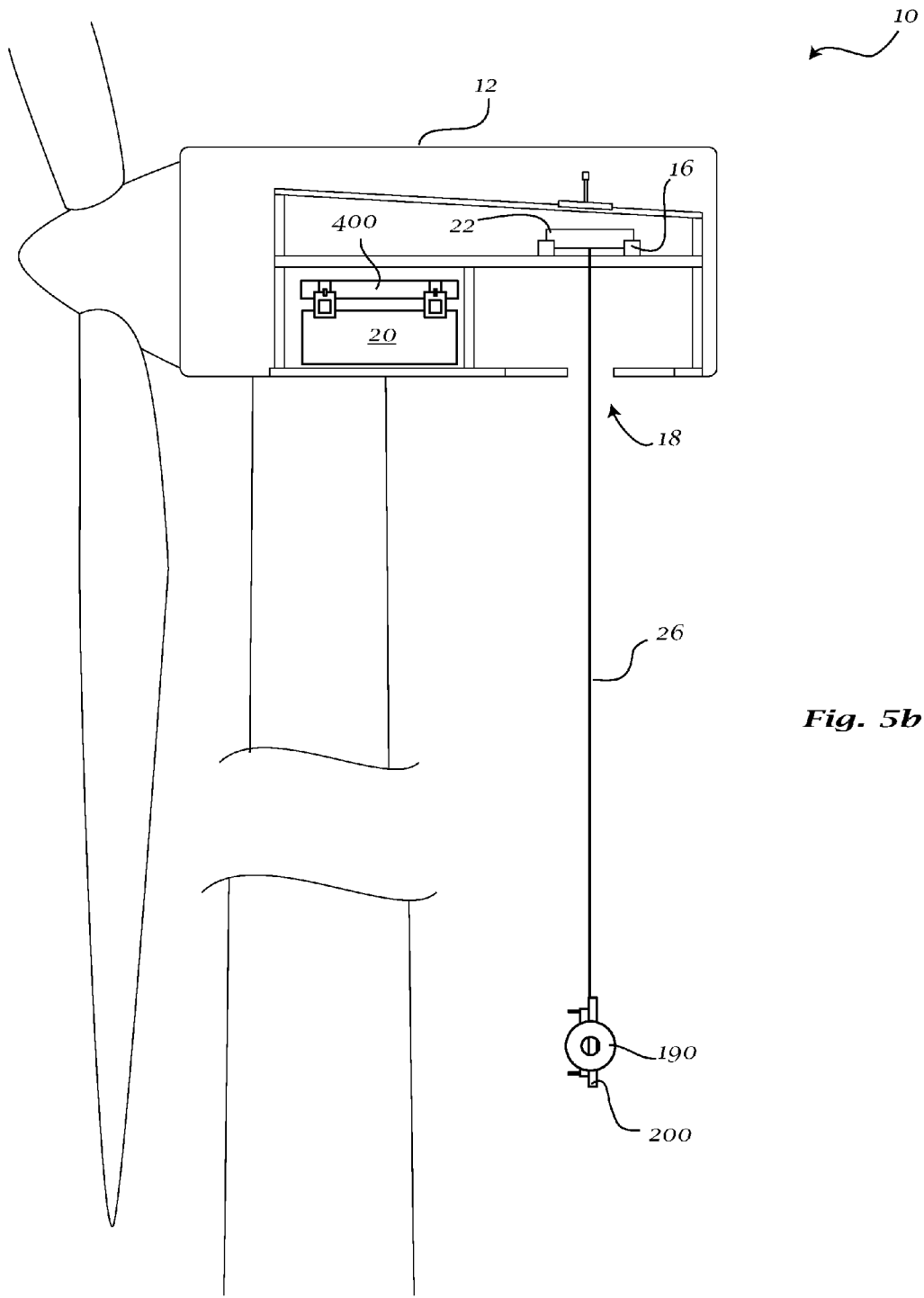

FIG. 5b is a schematic showing the lifting of hoist 200 into nacelle 12. A spool 190 including cable 192 may be removably coupled to hoist 200, for example using a sling, for the lifting operation. Light-duty hoist 22 may then be utilized to lift hoist 200 and spool 192 into nacelle 12. A cable 26 operatively coupled to light-duty hoist 22 may be coupled, for example using a hook, to an attachment point 209 on the hoist 200. This can allow hoist 200 to be lifted in a substantially vertical orientation, thereby allowing hoist 200 to pass through the smaller opening 18 in the nacelle. Hoist 200 may then be placed on a surface of the nacelle 12 and spool 190 may be decoupled therefrom. Spool 190 may then be rotatably coupled to a mount disposed within nacelle 12. The mount may be placed in any desired location in the nacelle that allows system 100 to function as described herein, for example on the rear frame of nacelle 12, proximate the component 20.

Figure 5C:
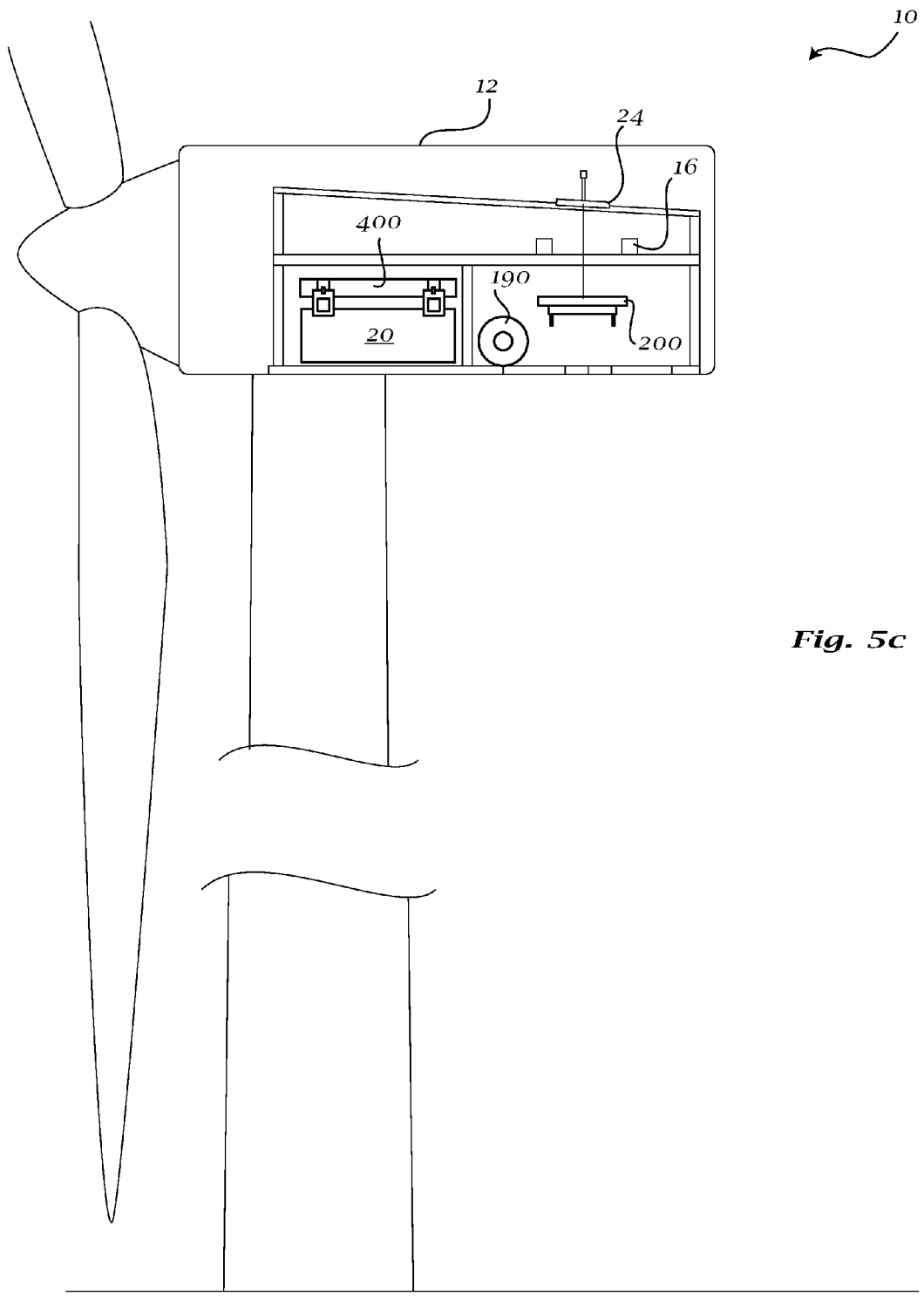

Subsequently, as shown in FIG. 5c, light-duty hoist 22 may be decoupled from trolley 16, and crane 24 may be used to lift the light-duty hoist away from trolley 16. Hoist 200 may then be moved onto trolley 16 by crane 24, and coupled to the trolley. At this point, trolley 16 may be translated along structural members 14 such that hoist 200 is disposed substantially over spreader 300/400.

Figure 5D:
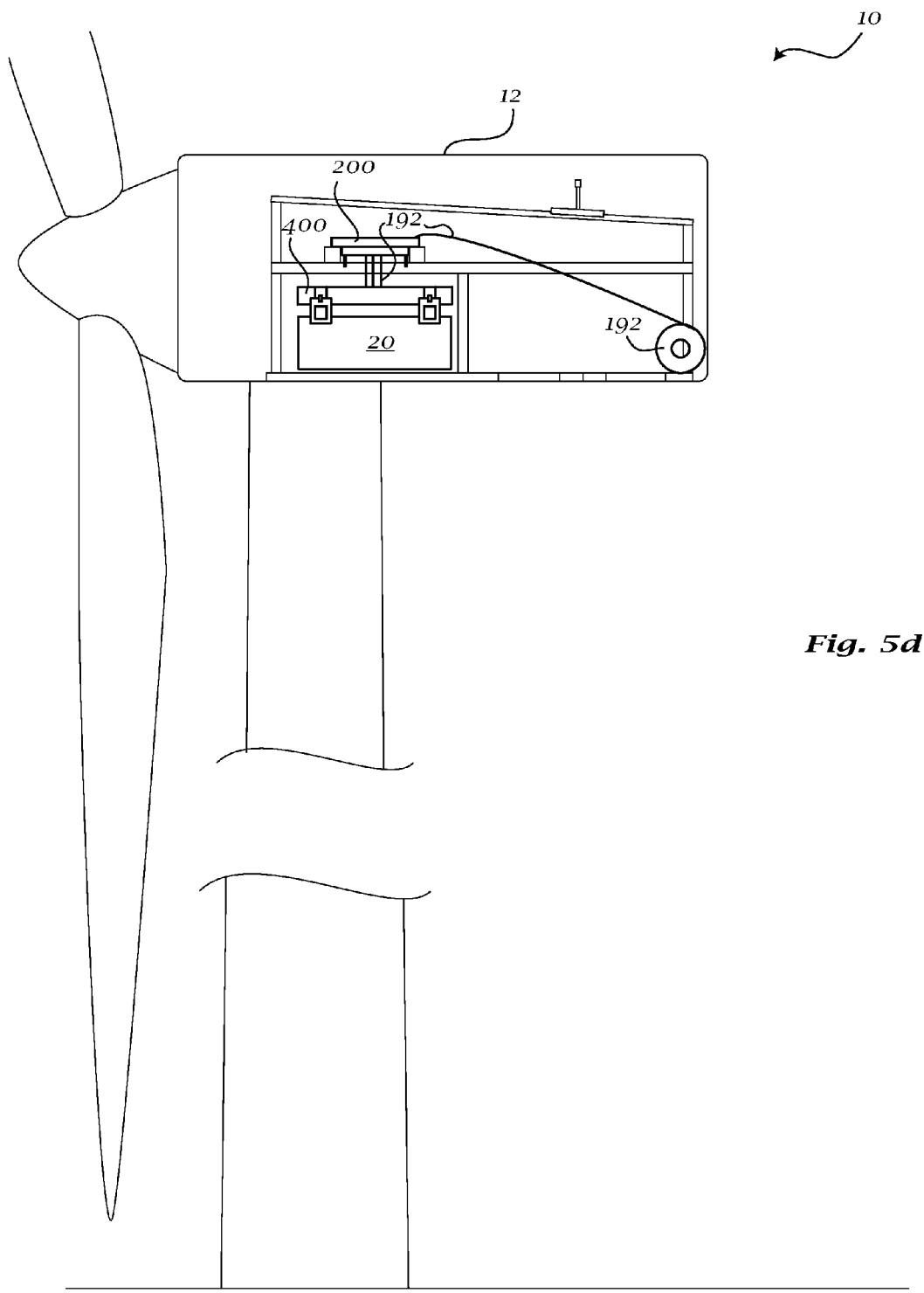
Figure 5E:
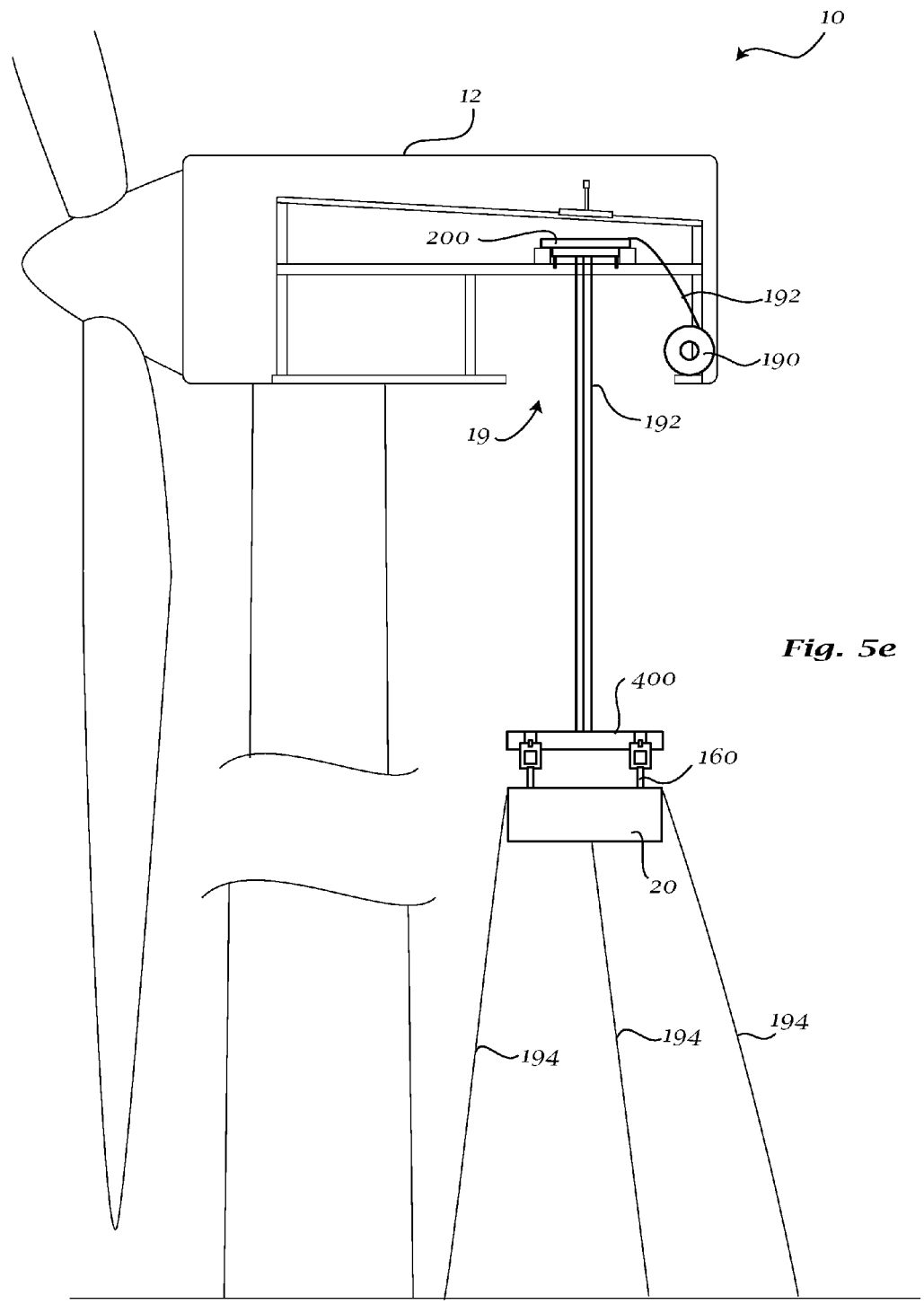

Turning to FIG. 5d, cable 192 may be fed from spool 190 to hoist 200. Lubrication may be provided to cable 192 during the feeding operation, using any appropriate lubricant, for example, Lucas™ Heavy Duty #2 Grease. Cable 192 may be routed through horizontal sheave 214 of hoist 200, through vertical sheave 216, and directed towards spreader 400. In some exemplary embodiments, hoist 200 and spreader 400 may be triple-rigged. Cable 192 may thus be routed from a first vertical sheave 216 of hoist 200, through sheave 414 of rotatable pulley assembly 412 of spreader 400, back towards a second vertical sheave 216 of hoist 200, and then coupled to cable coupling member 416 of pulley assembly 412. Coupling may be facilitated by a hook, by a cable thimble and cable crimp, or by any other known coupling that enables system 100 to function as described herein.

The floor of nacelle 12 may subsequently be opened so as to create a large opening 19 through which the component 20 may be received. Furthermore, guide cables 194 may be provided, with a first end of each guide cable being secured to an attachment point on the component 20, and a second end of each guide cable lowered to the ground. In some embodiments, three guide cables 194 may be received by personnel on the ground that are facilitating the lowering operation.

Motor 212 of hoist 200 may then be operated so as to lift component 20 from its position within nacelle 12 and subsequently lower component 20 through opening 19 and towards the ground. Tension can be maintained in guide cables 194 so as to reduce the likelihood of component 20 and spreader 300/400 swinging during the descent, thereby facilitating a steady, direct descent towards the ground. Guide cables 194 may further be used to rotate the generator during its descent, if necessary. Once on the ground, component 20 may be decoupled from spreader 300/400.

Similarly, a replacement component 20 located on the ground may be attached to spreader 300/400 as described above, raised into nacelle 12, and positioned in place within the nacelle using hoist 200 and spreader 300/400. The component raising process can be appreciated as being substantially the reverse of the component lowering process described above. The process described herein may be used to replace any wind turbine components for which an external crane would typically be used, such as generators, intercoolers, and any other desired components. Furthermore, the process described herein may be used to replace any components having dimensions and weights that exceed the capacities of light duty equipment (e.g., service cranes) of the wind turbine. Additionally, the process described herein may be used in offshore situations, wherein a marine vessel can be utilized in lieu of the ground surface.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for wind turbine component replacement, comprising: a spreader with a rigid pair of transverse members and at least one longitudinal member adjustably coupled so that the spreader is adapted to couple to any wind turbine component, the spreader including at least one first sheave of a pulley swivelably coupled to the spreader; and a hoist, the hoist adapted to couple to a member of a nacelle, the hoist including a frame sized and shaped to be disposed over members of the nacelle, a motor, and the at least one first sheave.

2. The system of claim 1, wherein the frame of the hoist comprises at least two longitudinal members and at least two transverse members, the longitudinal members having cut-outs to securely dispose the hoist over a structural member of the nacelle or a movable trolley, and one or more legs downwardly extendable from the frame.

3. The system of claim 2, wherein the motor of the hoist is disposed in a space between the longitudinal and transversal members of the hoist.

4. The system of claim 1, wherein the spreader further comprises attachment points located on the at least one longitudinal member to be lifted into the nacelle in a vertical orientation.

5. The system of claim 1, wherein the frame of the hoist further comprises attachment points to be lifted into the nacelle in a vertical orientation.

6. The system of claim 1, wherein the hoist further comprises a horizontal sheave rotatably coupled to the frame of the hoist and at least one vertical sheave rotatably coupled to an axle extending between the frame and at least one supporting member.

7. The system of claim 6, wherein the motor, horizontal sheave, and at least one vertical sheave provide a path for a cable, which is rigged to the spreader.

* * * * *